United States Patent
Okamoto et al.

(10) Patent No.: US 11,827,831 B2
(45) Date of Patent: Nov. 28, 2023

(54) FLUID COMPOSITION, REFRIGERANT COMPOSITION AND AIR CONDITIONER

(71) Applicants: AGC Inc., Chiyoda-ku (JP); NATIONAL INSTITUTE OF ADVANCED INDUSTRIAL SCIENCE AND TECHNOLOGY, Chiyoda-ku (JP)

(72) Inventors: Hidekazu Okamoto, Chiyoda-ku (JP); Hiroki Hayamizu, Chiyoda-ku (JP); Katsuya Ueno, Chiyoda-ku (JP); Hirokazu Takagi, Chiyoda-ku (JP); Masato Fukushima, Chiyoda-ku (JP); Kenji Takizawa, Tsukuba (JP)

(73) Assignees: AGC Inc., Chiyoda-ku (JP); NATIONAL INSTITUTE OF ADVANCED INDUSTRIAL SCIENCE AND TECHNOLOGY, Chiyoda-ku (JP)

(*) Notice: Subject to any disclaimer, the term of this patent is extended or adjusted under 35 U.S.C. 154(b) by 876 days.

(21) Appl. No.: 16/683,872

(22) Filed: Nov. 14, 2019

(65) Prior Publication Data

US 2020/0079985 A1 Mar. 12, 2020

Related U.S. Application Data

(63) Continuation of application No. 15/784,897, filed on Oct. 16, 2017, now abandoned, which is a (Continued)

(30) Foreign Application Priority Data

May 14, 2015 (JP) .................................. 2015-099031
Aug. 13, 2015 (JP) .................................. 2015-159870

(51) Int. Cl.
C09K 5/04 (2006.01)

(52) U.S. Cl.
CPC .............. *C09K 5/044* (2013.01); *C09K 5/045* (2013.01); *C09K 2205/122* (2013.01); *C09K 2205/126* (2013.01)

(58) Field of Classification Search
None
See application file for complete search history.

(56) References Cited

U.S. PATENT DOCUMENTS 9,624,413 B2 * 4/2017 Fukushima ............. F25B 13/00
9,828,537 B2 * 11/2017 Fukushima ............. C09K 5/045
(Continued)

FOREIGN PATENT DOCUMENTS

| CN | 1183451 A | 6/1998 |
|----|-----------|--------|
| CN | 101155892 A | 4/2008 |

(Continued)

OTHER PUBLICATIONS

International Search Report dated Aug. 9, 2016 in PCT/JP2016/064182, filed May 12, 2016.

*Primary Examiner* — Joseph D Anthony
(74) *Attorney, Agent, or Firm* — Oblon, McClelland, Maier & Neustadt, L.L.P.

(57) ABSTRACT

To provide a fluid composition and a refrigerant composition having flammability suppressed; and an air conditioner in which restrictions in order to inhibit combustion of the refrigerant composition are reduced and it is thereby possible to omit or simplify measures for inhibiting combustion of the refrigerant composition. The fluid composition is either a composition (I) comprising at least one component (A) selected from the group consisting of alkanes, halogenated alkanes and alkenes and at least one component (B) selected from halogenated alkenes, or a composition (II) (excluding the composition (I)) comprising two or more (Continued)

ingredients (B) selected from halogenated alkenes. The fluid composition has a combustion inhibiting effect as defined by −100×{(measured maximum burning velocity)−(estimated maximum burning velocity)}/(estimated maximum burning velocity), of at least 10%.

6 Claims, 2 Drawing Sheets

Related U.S. Application Data continuation of application No. PCT/JP2016/064182, filed on May 12, 2016.

(56) References Cited

U.S. PATENT DOCUMENTS

| | | | |
|---|---|---|---|
| 9,862,868 B2* | 1/2018 | Fukushima | C09K 5/045 |
| 9,957,427 B2* | 5/2018 | Carlson | B32B 15/18 |
| 9,957,429 B2 | 5/2018 | Fukushima | |
| 9,957,430 B2 | 5/2018 | Fukushima | |
| 9,969,917 B2 | 5/2018 | Fukushima | |
| 9,976,067 B2 | 5/2018 | Fukushima | |
| 10,053,607 B2 | 8/2018 | Hashimoto | |
| 10,131,527 B2 | 11/2018 | Fickert | |
| 10,131,828 B2 | 11/2018 | Okamoto | |
| 11,421,136 B2* | 8/2022 | Fukushima | C09K 5/045 |
| 11,421,138 B2* | 8/2022 | Fukushima | C10M 107/24 |
| 11,447,676 B2* | 9/2022 | Fukushima | C09K 5/045 |
| 2007/0108403 A1 | 5/2007 | Sievert et al. | |
| 2008/0157022 A1 | 7/2008 | Singh et al. | |
| 2008/0230738 A1 | 9/2008 | Minor et al. | |
| 2011/0108756 A1 | 5/2011 | Tsuchiya et al. | |
| 2012/0119136 A1 | 5/2012 | Yana Motta et al. | |
| 2012/0187330 A1 | 7/2012 | Singh | |
| 2012/0255316 A1 | 10/2012 | Andre et al. | |
| 2013/0012420 A1 | 1/2013 | Matsumoto | |
| 2013/0186115 A1 | 7/2013 | Yana Motta et al. | |
| 2014/0070132 A1 | 3/2014 | Fukushima | |
| 2014/0191153 A1 | 7/2014 | Yana Motta et al. | |
| 2015/0005538 A1* | 1/2015 | Furuta | C07C 17/269 570/159 |
| 2015/0376486 A1 | 12/2015 | Hashimoto et al. | |
| 2016/0017199 A1 | 1/2016 | Yana Motta et al. | |
| 2016/0018135 A1 | 1/2016 | Yuzawa et al. | |
| 2016/0024362 A1 | 1/2016 | Zhili et al. | |
| 2016/0075927 A1 | 3/2016 | Fukushima | |
| 2017/0369754 A1 | 12/2017 | Nishida | |
| 2019/0055442 A1 | 2/2019 | Singh et al. | |
| 2021/0309902 A1* | 10/2021 | Kumakura | C10M 171/008 |
| 2022/0089928 A1* | 3/2022 | Fukushima | C09K 5/045 |
| 2022/0112417 A1* | 4/2022 | Gotou | C07C 17/42 |
| 2023/0015937 A1* | 1/2023 | Fukushima | C09K 5/045 |

FOREIGN PATENT DOCUMENTS

| | | |
|---|---|---|
| CN | 101346450 A | 1/2009 |
| CN | 102660229 A | 9/2012 |
| CN | 107109198 A | 8/2017 |
| JP | 6-101913 | 4/1994 |
| JP | 2002-98391 | 4/2002 |
| JP | 2002-98393 | 4/2002 |
| JP | 2003-133000 | 5/2003 |
| JP | 2013-514516 | 4/2013 |
| JP | 2013-542312 | 11/2013 |
| JP | 2014-129543 | 7/2014 |
| JP | 2014-169455 | 9/2014 |
| JP | 2015-38214 | 2/2015 |
| JP | 2015-232318 | 12/2015 |
| JP | 2015-232319 | 12/2015 |
| JP | 2016-28119 | 2/2016 |
| WO | WO 2012/157764 A1 | 11/2012 |
| WO | WO 2014/139146 A1 | 9/2014 |
| WO | WO 2014/150699 A1 | 9/2014 |
| WO | WO 2014/156190 A1 | 10/2014 |
| WO | WO 2015/005290 A1 | 1/2015 |
| WO | WO 2015/125874 A1 | 8/2015 |
| WO | WO 2015/141677 A1 | 9/2015 |
| WO | WO 2015/141679 A1 | 9/2015 |

* cited by examiner

FLUID COMPOSITION, REFRIGERANT COMPOSITION AND AIR CONDITIONER

CROSS-REFERENCE TO RELATED APPLICATIONS

This application is a continuation application of U.S. patent application Ser. No. 15/784,897, filed on Oct. 16, 2017, which is a continuation of PCT Application No. PCT/JP2016/064182, filed on May 12, 2016, which is based upon and claims the benefit of priority from Japanese Patent Application No. 2015-99031 filed on May 14, 2015 and Japanese Patent Application No. 2015-159870 filed on Aug. 13, 2015. The contents of those applications are incorporated herein by reference in their entireties.

TECHNICAL FIELD

The present invention relates to a fluid composition, a refrigerant composition and an air conditioner.

BACKGROUND ART

Alkanes, halogenated alkanes, alkenes and halogenated alkenes which can become a gas or a liquid depending upon conditions such as pressure, etc. are used refrigerants, solvents, blowing agents, cleaning agents, etc. However, alkanes, halogenated alkanes, alkenes and halogenated alkenes are often flammable, and therefore, at the time of their use, it is necessary to have restrictions or measures in order to inhibit combustion.

For example, as a refrigerant to be sealed in a refrigeration cycle of an air conditioner, attention has been drawn to an alkane, a partially fluorinated alkane, a partially fluorinated alkene or the like which presents less impact on the ozone layer and less impact on global warming. However, if the refrigerant leaks from an indoor unit of the air conditioner, there is a possibility that the flammable refrigerant will be filled in the vicinity of the floor or in a closed narrow space. Therefore, at the time of using a flammable refrigerant, it is necessary to have the following restrictions or measures.

The filling amount of the refrigerant to be sealed in the refrigeration cycle is limited (IEC60335-2-40).

In a case where an indoor unit is to be installed in the vicinity of the floor or in a closed narrow space (in a room with a small floor space or in a car) in which the refrigerant is likely to be accumulated, it is necessary to take measures such that a gas leak sensor is provided (Patent Document 1), a ventilator is provided to the indoor unit (Patent Document 2), and a spark from the electrical equipment or electrical wiring of the unit is prevented (Patent documents 3 and 4).

PRIOR ART DOCUMENTS

Patent Documents

Patent Document 1: JP-A-2002-98391
Patent Document 2: JP-A-2002-98393
Patent Document 3: JP-A-6-101913
Patent Document 4: JP-A-2003-133000

DISCLOSURE OF INVENTION

Technical Problem

The present invention is to provide a fluid composition and a refrigerant composition having flammability suppressed, and an air conditioner in which restrictions in order to inhibit combustion of the refrigerant composition are reduced and it is thereby possible to omit or simplify measures for inhibiting combustion of the refrigerant composition.

Solution to Problem

The present inventors have made extensive studies on the composition of the fluid composition, and, as a result, have found that in a combination of a component selected from the group consisting of alkanes, halogenated alkanes and alkenes, and a component selected from the group consisting of halogenated alkenes, or in a combination of components selected from the group consisting of halogenated alkenes, there is a specific combination where the measured value of the burning velocity is significantly lower than the estimated value of the burning velocity.

The present invention has the following embodiments.

[1] A fluid composition being a composition (I) comprising at least one component (A) selected from the group consisting of alkanes (which may, if having two or more carbon atoms, have an etheric oxygen atom), halogenated alkanes (which may, if having two or more carbon atoms, have an etheric oxygen atom) and alkenes (which may, if having three or more carbon atoms, have an etheric oxygen atom), and at least one component (B) selected from halogenated alkenes (which may, if having three or more carbon atoms, have an etheric oxygen atom), or a composition (II) (excluding the composition (I)) comprising at least two components (B) selected from halogenated alkenes (which may, if having three or more carbon atoms, have an etheric oxygen atom), wherein the combustion inhibiting effect as defined by the following formula (1) is at least 10%, $$\varepsilon = -100 \times \frac{S_{u,max,blend} - S_{u,max,blend,calc}}{S_{u,max,blend,calc}} \quad (1)$$

where $\varepsilon$ (%) is a combustion inhibiting effect, $S_{u,max,blend}$ is the maximum value among measured values of the burning velocity in each equivalence ratio, and $S_{u,max,blend,calc}$ is the maximum value among estimated values of the burning velocity in each equivalence ratio obtainable by the following formula (2), $$S_{u,blend,calc}(\phi) = \frac{1}{\sum_{k=1}^{n} \frac{\alpha_i}{S_{u,i}(\phi)}} \quad (2)$$

where $S_{u,blend,calc}(\varphi)$ is an estimated value of the burning velocity in each equivalence ratio $\varphi$, n is the number of types of combustible components contained in the fluid composition, $S_{u,i}(\varphi)$ is the measured value of the burning velocity of the i-th combustible component, $\alpha_i$ is the energy fraction of the i-th combustible component obtainable by the following formula (3).

$$\alpha_i = \frac{\Delta H_{c,i} \cdot x_i}{\sum_{k=1}^{m} \Delta H_{c,i} \cdot x_i} \quad (3)$$

where $\Delta H_{c,i}$ is the heat of combustion of the i-th combustible component, and $x_i$ is the mole fraction of the i-th combustible component.

[2] The fluid composition according to [1], wherein the component (A) is a component selected from the group consisting of $C_{1-6}$ alkanes (which may, if having two or more carbon atoms, have an etheric oxygen atom), $C_{1-6}$ halogenated alkanes (which may, if having two or more carbon atoms, have an etheric oxygen atom) and $C_{2-6}$ alkenes (which may, if having three or more carbon atoms, have an etheric oxygen atom).

[3] The fluid composition according to [1], wherein the component (A) is a component selected from the group consisting of $C_{1-3}$ alkanes (which may, if having two or more carbon atoms, have an etheric oxygen atom), $C_{1-3}$ halogenated alkanes (which may, if having two or more carbon atoms, have an etheric oxygen atom) and $C_{2-3}$ alkenes (which may, if having three or more carbon atoms, have an etheric oxygen atom).

[4] The fluid composition according to [1], wherein the component (A) is a component selected from the group consisting of a $C_{1\ or\ 2}$ alkane (which may, if having two or more carbon atoms, have an etheric oxygen atom), a $C_{1\ or\ 2}$ halogenated alkane (which may, if having two or more carbon atoms, have an etheric oxygen atom) and a $C_2$ alkene.

[5] The fluid composition according to [1], wherein the component (A) is a component selected from the group consisting of difluoromethane, fluoromethane, methane, 1,1,1-trifluoroethane, 1,1,2-trifluoroethane, 1,1-difluoroethane, 1,2-difluoroethane, fluoroethane, ethane, 1,1,1,3,3-pentafluorobutane, trifluoromethyl methyl ether, pentafluoroethyl methyl ether, heptafluoropropyl methyl ether, 1,1,2,2-tetrafluoroethoxymethane, dichloromethane, chloromethane, 1,1-dichloroethane, 1,2-dichloroethane, chloroethane, 1,1-dichloro-1-fluoroethane and 1-chloro-1,1-difluoroethane.

[6] The fluid composition according to any one of [1] to [5], wherein the component (B) is a component selected from the group consisting of $C_{2-5}$ halogenated alkenes (which may, if having three or more carbon atoms, have an etheric oxygen atom).

[7] The fluid composition according to any one of [1] to [5], wherein the component (B) is a component selected from the group consisting of $C_{2-3}$ halogenated alkenes (which may, if having three or more carbon atoms, have an etheric oxygen atom).

[8] The fluid composition according to any one of [1] to [5], wherein the component (B) is a component selected from the group consisting of tetrafluoroethylene, 1,1,2-trifluoroethylene, cis-1,2-difluoroethylene, trans-1,2-difluoroethylene, 1,1-difluoroethylene, vinyl fluoride, cis-1,2-dichloroethylene, trans-1,2-dichloroethylene, 1,1-dichloroethylene, vinyl chloride, chlorotrifluoroethylene, 1-chloro-1-fluoroethylene, cis-1-chloro-2-fluoroethylene, trans-1-chloro-2-fluoroethylene, hexafluoropropylene, 1,2,3,3,3-pentafluoropropene, 2,3,3,3-tetrafluoropropene, cis-1,3,3,3-tetrafluoropropene, trans-1,3,3,3-tetrafluoropropene and 3,3,3-trifluoropropene.

[9] The fluid composition according to any one of [1] to [8], wherein the maximum value among measured values of the burning velocity in each equivalence ratio of the component (A) is at least 1 cm/sec, and
the maximum value among measured values of the burning velocity in each equivalence ratio of the component (B) is at least 1 cm/sec.

[10] A refrigerant composition comprising the fluid composition as defined in any one of [1] to [9].

[11] An air conditioner having the refrigerant composition as defined in [10] sealed in a refrigeration cycle.

[12] The air conditioner according to [11], which is a floor type air conditioner wherein an indoor unit housing a part of said refrigeration cycle, is installed on the floor in a room.

[13] The air conditioner according to [11], which is an air conditioner for an automobile.

Advantageous Effects of Invention

The fluid composition and refrigerant composition of the present invention become ones having flammability suppressed.

The air conditioner of the present invention is such that restrictions in order to inhibit combustion of the refrigerant composition are reduced, and it is thereby possible to omit or simplify measures for inhibiting combustion of the refrigerant composition.

DESCRIPTION OF EMBODIMENTS

Figure 1:
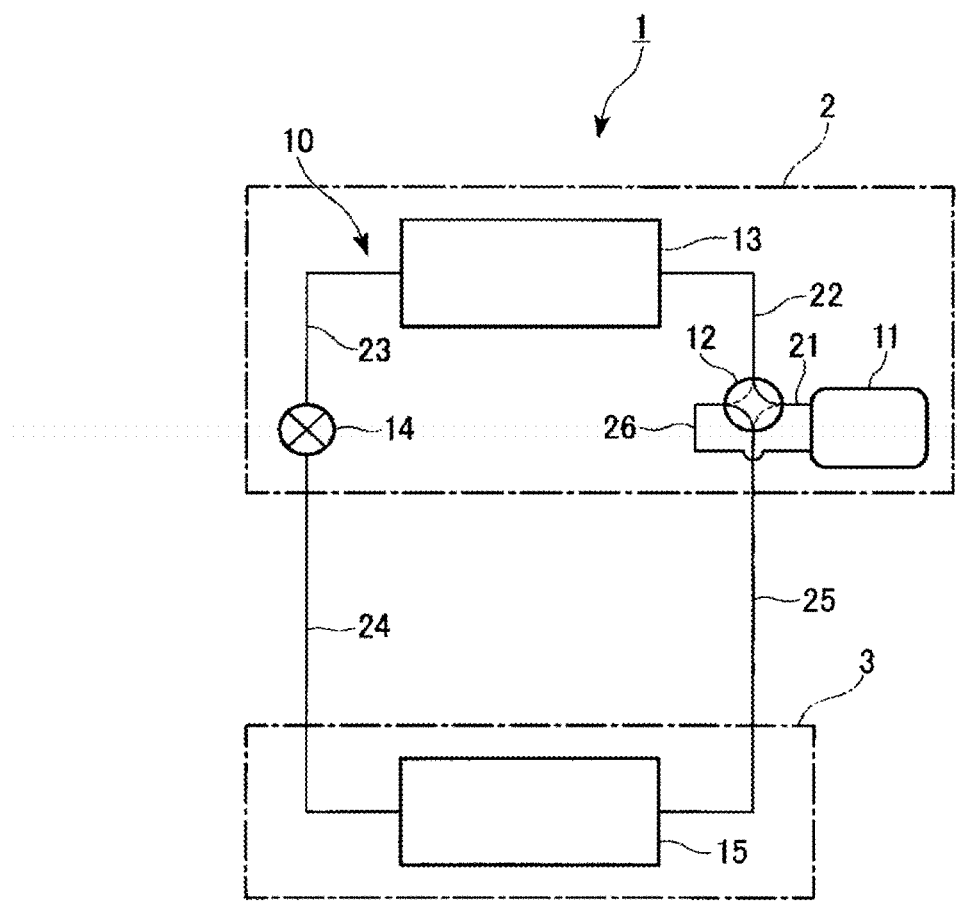
FIG. 1 is a schematic diagram showing an example of an air conditioner.

The following definitions of terms apply throughout this specification and claims.

A "fluid" is a general term for a gas and a liquid.

An "equivalence ratio" is a ratio of the mixing ratio (combustible component/air) of a combustible component to air in a mixed gas as an object for measurement or estimation of the burning velocity, to the mixing ratio (combustible component/air) in the stoichiometric mixed gas.

The "stoichiometric mixed gas" is a mixed gas of a combustible component and air, which contains oxygen in an amount just enough for complete combustion of the combustible component.

A "combustible component" is a component, of which a mixed gas with air, has a flammable range.

A "flammable range" is a range of the mixing ratio of the combustible component to air, in which the mixed gas becomes flammable.

A "refrigerant" is a compound that can be vaporized and liquefied in a refrigeration cycle.

A "halogenated alkane" is a compound having some or all of hydrogen atoms in an alkane substituted by halogen atoms.

A "halogenated alkene" is a compound having some or all of hydrogen atoms in an alkene substituted by halogen atoms.

A "partially fluorinated alkane" is a compound having some of hydrogen atoms in an alkane substituted by fluorine atoms.

A "partially fluorinated alkene" is a compound having some of hydrogen atoms in an alkene substituted by fluorine atoms.

An "etheric oxygen atom" is an oxygen atom forming an ether bond (—O—) between carbon-carbon atoms.

<Fluid Composition>

The fluid composition of the present invention is the following composition (I) or the following composition (II), wherein the combustion inhibiting effect to be described later is at least 10%.

(Composition (I))

The composition (I) comprises at least one of the following component (A) and at least one of the following component (B).

Component (A): component selected from the group consisting of alkanes (which may, if having two or more carbon atoms, contain an etheric oxygen atom), halogenated alkanes (which may, if having two or more carbon atoms, contain an etheric oxygen atom) and alkenes (which may, if having three or more carbon atoms, contain an etheric oxygen atom).

Component (B): component selected from halogenated alkenes (which may, if having three or more carbon atoms, contain an etheric oxygen atom).

As the component (A), from the viewpoint of having a preferred boiling point as a refrigerant, solvent, blowing agent or cleaning agent, preferred is a component selected from the group consisting of a $C_{1-6}$ alkane, a $C_{1-6}$ halogenated alkane and a $C_{2-6}$ alkene. Among them, more preferred is a component selected from the group consisting of a $C_{1-3}$ alkane, a $C_{1-3}$ halogenated alkane and a $C_{2\text{ or }3}$ alkene, and particularly preferred is a component selected from the group consisting of a $C_{1\text{ or }2}$ alkane, a $C_{1\text{ or }2}$ halogenated alkane and a $C_2$ alkene.

Further, with a view to presenting less impact on the ozone layer and less impact on global warming, as the component (A), one having a global warming potential (GWP) of at most 1,000 is preferred, and a component selected from the group consisting of alkanes and partially fluorinated alkanes, is preferred. Since such component (A) is often flammable, by combining it with component (B), it is possible to suppress the global warming potential and to suppress the flammability, whereby effects of the present invention will be sufficiently exhibited.

The alkanes include methane, ethane, propane, butane, isobutane, pentane, isopentane, neopentane, cyclopentane, hexane, cyclohexane, dimethyl ether, ethyl methyl ether, diethyl ether, etc. As the alkane, one type may be used alone, or two or more types may be used in combination.

As the alkane, from such a viewpoint that the effects of the present invention can be sufficiently exhibited when combined with component (B), methane or ethane is preferred, and methane is more preferred.

The halogen atom in a halogenated alkane may, for example, be a fluorine atom, a chlorine atom, a bromine atom or the like, and from the viewpoint of less impact on the ozone layer, a fluorine atom is preferred.

The halogenated alkanes include difluoromethane (HFC-32), fluoromethane (HFC-41), pentafluoroethane (HFC-125), 1,1,1,2-tetrafluoroethane (HFC-134a), 1,1,2,2-tetrafluoroethane (HFC-134), 1,1,1-trifluoroethane (HFC-143a), 1,1,2-trifluoroethane (HFC-143), 1,1-difluoroethane (HFC-152a), 1,2-difluoroethane (HFC-152), fluoroethane (HFC-161), 1,1,1,3,3-pentafluorobutane (HFC-365mfc), trifluoromethyl methyl ether (HFE-143a), pentafluoroethyl methyl ether, heptafluoropropyl methyl ether, 1,1,2,2-tetrafluoroethoxy methane, dichloromethane, chloromethane, 1,1-dichloroethane, 1,2-dichloroethane, chloroethane, 1,1-dichloro-1-fluoroethane (HCFC-141b), 1-chloro-1,1-difluoroethane (HCFC-142b), etc. As the halogenated alkane, one type may be used alone, or two or more types may be used in combination.

As the halogenated alkane, from such a viewpoint that the effects of the present invention are sufficiently exhibited when combined with component (B), preferred is at least one member selected from the group consisting of HFC-32, HFC-41, HFC-143a, HFC-143, HFC-152a, HFC-152, HFC-161, HFC-365mfc, HFE-143a, pentafluoroethyl methyl ether, heptafluoropropyl methyl ether, 1,1,2,2-tetrafluoroethoxymethane, dichloromethane, chloromethane, 1,1-dichloroethane, 1,2-dichloroethane, chloroethane, HCFC-141b and HCFC-142b. Among them, more preferred is at least one member selected from the group consisting of HFC-32, HFC-41, HFC-143a, HFC-143, HFC-152a, HFC-161 and HFE-143a.

The alkenes include known compounds, such as ethylene, propylene, etc. As the alkene, one type may be used alone, or two or more types may be used in combination.

As the component (B), from the viewpoint of having a preferred boiling point as a refrigerant, solvent, blowing agent or cleaning agent, preferred is a component consisting of a $C_{2-5}$ halogenated alkene. Among them, more preferred is a component consisting of a $C_{2\text{ or }3}$ halogenated alkene.

Further, as the component (B), from such a viewpoint that it is easy to suppress combustion of the fluid composition, preferred is one wherein the number of hydrogen atoms is at most the number of halogen atoms.

As the component (B), from the viewpoint of less impact on the ozone layer and less impact on global warming, a component consisting of a partially fluorinated alkene is preferred.

The halogen atom in a halogenated alkene may, for example, be a fluorine atom, a chlorine atom, a bromine atom or the like, and from the viewpoint of less impact on the ozone layer, a fluorine atom is preferred.

The halogenated alkenes include tetrafluoroethylene (PFO-1114), 1,1,2-trifluoroethylene (HFO-1123), cis-1,2-difluoroethylene (HFO-1132 (Z)), trans-1,2-difluoroethylene (HFO-1132 (E)), 1,1-difluoroethylene (HFO-1132a), vinyl fluoride (HFO-1141), tetrachloroethylene, 1,1,2-trichloroethylene, cis-1,2-dichloroethylene, trans-1,2-dichloroethylene, 1,1-dichloroethylene, vinyl chloride, chlorotrifluoroethylene (CFO-1113), 1,1-dichloro-2,2-difluoroethylene (CFO-1112a), cis-1,2-dichloro-1,2-difluoroethylene (CFO-1112 (Z)), trans-1,2-dichloro-1,2-difluoroethylene (CFO-1112 (E)), cis-1-chloro-1,2-difluoroethylene (HCFO-1122 (Z)), trans-1-chloro-1,2-difluoroethylene (HCFO-1122 (E)), 1-chloro-2,2-difluoroethylene, 1-chloro-1-fluoroethylene (HCFO-1131a), cis-1-chloro-2-fluoroethylene, trans-1-chloro-2-fluoroethylene, hexafluoropropylene (PFO-1216), 1,2,3,3,3-pentafluoropropene (HFO-1225ye), 2,3,3,3-tetrafluoropropene (HFO-1234yf), cis-1,3,3,3-tetrafluoropropene (HFO-1234ze (Z)), trans-1,3,3,3-tetrafluoropropene (HFO-1234ze (E)), 3,3,3-trifluoropropene (HFO-1243z)), etc. As the halogenated alkene, one type may be used alone, or two or more types may be used in combination.

As the halogenated alkene, from such a viewpoint that the effects of the present invention can be sufficiently exhibited when combined with component (A), preferred is at least one member selected from the group consisting of PFO-1114, HFO-1123, HFO-1132 (Z), HFO-1132 (E), HFO-1132a, HFO-1141, cis-1,2-dichloroethylene, trans-1,2-dichloroethylene, 1,1-dichloroethylene, vinyl chloride, CFO-1113, HCFO-1131a, cis-1-chloro-2-fluoroethylene, trans-1-chloro-2-fluoroethylene, PFO-1216, HFO-1225ye, HFO-1234yf, HFO-1234ze (Z), HFO-1234ze (E) and HFO-1243zf. Among them, more preferred is at least one member selected from the group consisting of PFO-1114, HFO-1123, HFO-1132 (Z), HFO-1132 (E), HFO-1132a, CFO-1113, PFO-1216, HFO-1225ye, HFO-1234yf, HFO-1234ze (Z), HFO-1234ze (E) and HFO-1243zf.

Component (A) and component (B) are selected so that the combustion inhibiting effect of the composition (I) having them combined, would be at least 10%. Preferred combinations of component (A) and component (B) include the following combinations.

(I-1) combination of HFC-32 and HFO-1123.
(I-2) combination of HFC-152a and HFO-1123.
(I-3) combination of HFC-32 and PFO-1114.
(I-4) combination of HFC-41 and PFO-1114.
(I-5) combination of methane and PFO-1114.
(I-6) combination of HFC-143a and PFO-1114.
(I-7) combination of HFC-152a and PFO-1114.
(I-8) combination of HFE-143a and PFO-1114.
(I-9) combination of HFC-365mfc and PFO-1114.
(I-10) combination of HFC-152a and CFO-1113.
(I-11) combination of HCFC-141b and PFO-1114.
(I-12) combination of HCFC-142b and HFO-1123.
(I-13) combination of HFC-152a and PFO-1216.
(I-14) combination of HFC-32, HFC-152a and HFO-1123.

The mixing ratio of component (A) to component (B) is adjusted to be such a ratio that the combustion inhibiting effect of the composition (I) would be at least 10%.

For example, in the case of combination (I-1), in the total (100 vol %) of HFC-32 and HFO-1123, the proportion of HFO-1123 is, in a range of from 0.5-99.5 vol % wherein the combustion inhibiting effect appears, preferably from 5 to 85 vol % wherein the combustion inhibiting effect would be at least 10%, more preferably from 15 to 70 vol % wherein the combustion inhibiting effect would be at least 20%.

In the case of combination (I-2), in the total (100 vol %) of HFC-152a and HFO-1123, the proportion of HFO-1123 is, in a range of from 55 to 99.5 vol % wherein the combustion inhibiting effect appears, preferably from 63 to 90 vol % wherein the combustion inhibiting effect would be at least 10%, more preferably from 70 to 85 vol % wherein the combustion inhibiting effect would be at least 20%.

In the case of combination (I-3), in the total (100 vol %) of HFC-32 and PFO-1114, the proportion of PFO-1114 is, in a range of from 0.5 to 99.5 vol % wherein the combustion inhibiting effect appears, preferably from 3 to 90 vol % wherein the combustion inhibiting effect would be at least 10%, more preferably from 7 to 85 vol % wherein the combustion inhibiting effect would be at least 20%.

In the case of combination (I-4), in the total (100 vol %) of HFC-41 and PFO-1114, the proportion of PFO-1114 is, in a range of from 35 to 99.5 vol % wherein the combustion inhibiting effect appears, preferably from 36 to 90 vol % wherein the combustion inhibiting effect would be at least 10%.

In the case of combination (I-5), in the total (100 vol %) of methane and PFO-1114, the proportion of PFO-1114 is, in a range of from 52 to 99.5 vol % wherein the combustion inhibiting effect appears, preferably from 53 to 78 vol % wherein the combustion inhibiting effect would be at least 10%.

In the case of combination (I-6), in the total (100 vol %) of HFC-143a and PFO-1114, the proportion of PFO-1114 is, in a range of from 0.5 to 99.5 vol % wherein the combustion inhibiting effect appears, preferably from 1 to 90 vol % wherein the combustion inhibiting effect would be at least 10%.

In the case of combination (I-7), in the total (100 vol %) of HFC-152a and PFO-1114, the proportion of PFO-1114 is, in a range of from 36 to 99.5 vol % wherein the combustion inhibiting effect appears, preferably from 39 to 85 vol % wherein the combustion inhibiting effect would be at least 10%.

In the case of combination (I-8), in the total (100 vol %) of HFE-143a and PFO-1114, the proportion of PFO-1114 is, in a range of from 26 to 99.5 vol % wherein the combustion inhibiting effect appears, preferably from 42 to 90 vol % wherein the combustion inhibiting effect would be at least 10%.

In the case of combination (I-9), in the total (100 vol %) of HFC-365mfc and PFO-1114, the proportion of PFO-1114 is, in a range of from 0.5 to 99.5 vol % wherein the combustion inhibiting effect appears, preferably from 5 to 90 vol % wherein the combustion inhibiting effect would be at least 10%.

In the case of combination (I-10), in the total (100 vol %) of HFC-152a and CFO-1113, the proportion of CFO-1113 is, in a range of from 40 to 99.5 vol % wherein the combustion inhibiting effect appears, preferably from 50 to 85 vol % wherein the combustion inhibiting effect would be at least 10%.

(Composition (II))

The composition (II) comprises at least two components (B) (excluding the composition (I)).

As the component (B), the same ones as described as component (B) in the composition (I) may be mentioned, and its preferred embodiments are also the same.

At least two components (B) are selected so that the combustion inhibiting effect of the composition (II) having them combined, would be at least 10%. Preferred combinations of at least two components (B), include the following combinations.

(II-1) combination of HFO-1243zf and HFO-1123.
(II-2) combination of HFO-1141 and PFO-1114.
(II-3) combination of HFO-1132a and PFO-1114.
(II-4) combination of HFO-1234yf and CFO-1113.

The mixing ratio of at least two components (B) is adjusted to be such a ratio that the combustion inhibiting effect of the composition (II) would be at least 10%.

For example, in the case of combination (II-1), in the total (100 vol %) of HFO-1243zf and HFO-1123, the proportion of HFO-1123 is, in a range of from 25 to 99.5 vol % wherein the combustion inhibiting effect appears, preferably from 30 to 80 vol % wherein the combustion inhibiting effect would be at least 10%, more preferably from 40 to 70 vol % wherein the combustion inhibiting effect would be at least 20%.

(Other Components)

The fluid composition may contain component(s) other than the component (A) and the component (B), in a range not to impair the effects of the present invention.

(Halogen Atoms/Hydrogen Atoms)

In the fluid composition of the present invention, the ratio (halogen atoms/hydrogen atoms) of the total number of halogen atoms to the total number of hydrogen atoms, in compounds in the components (A) and (B) contained in the composition, is preferably at least 1.0, more preferably at least 1.03, further preferably at least 1.06.

(Combustion Inhibiting Effect)

The combustion inhibiting effect of the fluid composition is defined by the following formula (1).

$$\varepsilon = -100 \times \frac{S_{u,max,blend} - S_{u,max,blend,calc}}{S_{u,max,blend,calc}} \quad (1)$$

where ε (%) is a combustion inhibiting effect, $S_{u,max,blend}$ is the maximum value (hereinafter referred to also as the measured maximum burning velocity) among measured values of the burning velocity in each equivalence ratio, and $S_{u,max,blend,calc}$ is the maximum value (hereinafter referred to also as the estimated maximum burning velocity) among estimated values of the burning velocity in each equivalence ratio obtainable by the following formula (2), $$S_{u,blend,calc}(\phi) = \frac{1}{\sum_{i=1}^{n} \frac{\alpha_i}{S_{u,i}(\phi)}} \quad (2)$$

where $S_{u,blend,calc}$ (φ) is an estimated value of the burning velocity in each equivalence ratio φ, n is the number of types of combustible components contained in the fluid composition, $S_{u,i}$ (φ) is the measured value of the burning velocity of the i-th combustible component, $\alpha_i$ is the energy fraction of the i-th combustible component obtainable by the following formula (3), $$\alpha_i = \frac{\Delta H_{c,i} \cdot x_i}{\sum_{i=1}^{n} \Delta H_{c,i} \cdot x_i} \quad (3)$$

where $\Delta H_{c,i}$ is the heat of combustion of the i-th combustible component, and $x_i$ is the mole fraction of the i-th combustible component.

The formula (2) is a Le Chatelier's formula having the mixing ratio replaced by the energy fraction (see Reference 1). The formula (2) can express the burning velocity accurately with respect to a fluid composition wherein each flammable component shows no chemical interaction. A similar formula has already been adopted in the legislation of Japan (see Reference 2).

Reference 1: L. Sileghem et al., Energy Fuels, 26, 4721 (2012).

Reference 2: 1970 the Ministry of International Trade and Industry Notification No. 634 of Japan "Matter to define the method of measuring the amount of heat and combustion of gas", which has been used for the calculation of the maximum burning velocity of gas in the enforcement regulations of Gas Business Act.

The heat of combustion in the formula (3) is represented by the difference between the sum of the enthalpies of formation of products in the formation system in the combustion reaction formula and the enthalpy of formation of the compound in the reaction system. The enthalpy of formation is described in Chemical Handbook, International Standards (see Reference 3), various handbooks, etc. With respect to an absolutely new compound, it can be obtained by the Benson group additivity rule (see Reference 4) or the computational chemistry techniques. The concept of the combustion reaction formula of a compound containing halogen is defined in international standards (see References 3 and 5).

Reference 3: ANSI/ASHRAE Standard 34 (2013), Designation and Safety Classification of Refrigerants.

Reference 4: S. Benson, Thermo chemical kinetics, 2nd Ed., Wiley Interscience, New York (1976).

Reference 5: ISO 817 (2014), Refrigerant: Designation and Safety Classification.

The combustion inhibiting effect of the fluid composition is at least 10%, preferably at least 20%, more preferably at least 30%.

The burning velocity is inversely proportional to one-third power of the energy required for ignition (the minimum ignition energy). That is, the fact that the burning velocity decreases by 30%, means that the minimum ignition energy becomes larger by 3 times, and the possibility of ignition decreases correspondingly, whereby it is possible to more simplify measures against static electricity or the ignition source such as an electrical outlet.

Validity for defining the standard for the combustion inhibiting effect (the reduction by at least 10% than the estimated maximum burning velocity) is shown below.

The absolute value of the burning velocity varies to some extent depending upon the measurement method, and in the current international standards, an error within 10% is allowed for the reference gas (see References 1 and 5). Therefore, in the present invention, it is proposed that without defining the method for measuring the burning velocity, a relative value of values measured by a unified method is to be used as a combustion inhibiting effect.

With respect to measured values of burning velocities of fluid compositions which have been reported heretofore, there is no case wherein the measured burning velocity is reduced beyond 10% as compared to the estimated value by the formula (2).

In a case where the heat of combustion is estimated depending upon the Benson group additivity rule (see Reference 4), there is a possibility that an error by about 3% will result.

In consideration of the foregoing, the reduction of the maximum burning velocity by at least 10% is deemed to be the combustion inhibiting effect in the present invention.

The measured maximum burning velocity of component (A) is preferably at least 1 cm/sec, more preferably at least 5 cm/sec, further preferably at least 10 cm/sec. The measured maximum burning velocity of component (B) is preferably at least 1 cm/sec, more preferably at least 5 cm/sec.

The measured maximum burning velocity of each component being at least the lower limit value in the above range, indicates that flammability of each component is high. In the present invention, such an unpredictable effect is exhibited that despite the combination of highly combustible components (A) and highly combustible component (B), it is possible to obtain a fluid composition having its flammability suppressed.

(Applications)

The fluid composition of the present invention is used as a refrigerant composition, a solvent composition, a blowing agent composition, a cleaning agent composition, or the like. Hereinafter, it will be described in detail with reference to a refrigerant composition as an example.

<Refrigerant Composition>

A refrigerant composition of the present invention is made of the fluid composition of the present invention. The refrigerant composition of the present invention comprises, as a refrigerant, at least one following component (A) and at least one following component (B), or at least two components (B).

(Other Components)

The refrigerant composition may contain component(s) other than the components (A) and (B) in a range not to impair the effects of the present invention.

Such other components include a refrigerant other than the components (A) and (B), a stabilizer, a leak detection material, etc. Specific examples of such other components include an alcohol, ammonia, carbon dioxide, etc.

The total proportion of the component (A) and the component (B) is, in the total (100 mass %) of the refrigerant, preferably from 60 to 100 mass %, more preferably from 70 to 100 mass %, further preferably from 80 to 100 mass %, particularly preferably from 90 to 100 mass %, and most preferably 100 mass %.

The proportion of another refrigerant is, in the total (100 mass %) of the refrigerant, preferably from 0 to 40 mass %, more preferably 0 to 30 mass %, further preferably from 0 to 20 mass %, particularly preferably from 0 to 10 mass %, most preferably 0 mass %.

A stabilizer is a component to improve stability of the refrigerant against heat and oxidation.

The stabilizer may, for example, be an oxidation resistance improving agent, a heat resistance improving agent, a metal deactivator, etc.

The amount of the stabilizer to be added, may be within a range not to substantially reduce the effects of the present invention, and is, in the total (100 parts by mass) of the refrigerant, preferably at most 5 parts by mass, more preferably at most 1 part by mass.

The leak detection material may, for example, be an ultraviolet fluorescent dye, an odorous gas, an odor masking agent, etc. In the case of using a leak detection material, a solubilizing agent to enhance the solubility of the leak detection material in the refrigerant, may be used.

The amount of the leak detection material to be added, may be within a range not to substantially reduce the effects of the present invention, and is, in the total (100 parts by mass) of the refrigerant, preferably at most 2 parts by mass, more preferably at most 0.5 part by mass.

<Air Conditioner>

The air conditioner of the present invention is an air conditioner having the refrigerant composition of the present invention sealed in a refrigeration cycle.

(Refrigerating Cycle)

As the refrigeration cycle, usually, a vapor compression refrigeration cycle is employed.

The vapor compression refrigeration cycle is constituted by connecting a compressor and a condenser, the condenser and a pressure reducing mechanism, the pressure reducing mechanism and an evaporator, and the evaporator and the compressor, respectively, by piping.

(Other Components)

In the refrigeration cycle, other component(s) than the refrigerant composition may be sealed. Other components include a refrigerating machine oil for the compressor, a drying agent, etc.

The refrigerating machine oil may, for example, be an oxygen-containing synthetic oil (an ester type synthetic oil, an ether type synthetic oil, etc.), a fluorinated synthetic oil, a hydrocarbon type synthetic oil, a mineral oil, etc.

The ester type synthetic oil may, for example, be a dibasic acid ester oil, a polyol ester oil, a complex ester oil, a polyol carbonate ester oil, etc.

The ether type synthetic oil may, for example, be a polyvinyl ether oil, a polyoxyalkylene type synthetic oil, etc.

The fluorinated synthetic oil may, for example, be one obtained by substituting hydrogen atoms of a synthetic oil by fluorine atoms, a perfluoropolyether oil, a fluorinated silicone oil, etc.

The hydrocarbon type synthetic oil may, for example, be a poly α-olefin, an alkylbenzene, an alkylnaphthalene, etc.

The mineral oil may, for example, be a paraffinic mineral oil, a naphthenic mineral oil, etc.

As the refrigerating machine oil, one type may be used alone, or two or more types may be used in combination.

As the refrigerating machine oil, from the viewpoint of compatibility with the refrigerant composition, preferred is a polyol ester oil or a polyglycol oil, and from such a viewpoint that a significant antioxidant effect is obtainable by the stabilizer, particularly preferred is a polyalkylene glycol oil.

The sealed amount of the refrigerating machine oil may be within a range not to substantially reduce the effects of the present invention, and although it may vary also depending on the application, the format of the compressor, etc., it is preferably from 10 to 100 parts by mass, more preferably from 20 to 50 parts by mass, based on the refrigerant composition (100 parts by mass).

The drying agent may, for example, be silica gel, activated alumina, zeolite, etc. As the drying agent, a zeolite type drying agent is preferred from the viewpoint of the chemical reactivity of the drying agent and the refrigerant, and the moisture absorption capability of the drying agent.

The size of the zeolite type drying agent is preferably from 0.5 to 5 mm, since if it is too small, clogging in a valve or a narrow portion of piping tends to be caused, and if it is too large, the drying capacity tends to be reduced. As the shape, granular or cylindrical is preferred. The amount of the zeolite type drying agent to be sealed, is not particularly limited.

Practical Embodiment

FIG. 1 is a schematic diagram showing an example of an air conditioner. An air conditioner 1 comprises a compressor 11 to compress a refrigerant, a four-way valve 12 for switching between a refrigerant circuit during cooling operation and a refrigerant circuit during heating operation, an outdoor heat exchanger 13 to exchange the heat of the refrigerant and the heat of the outdoor air, an expansion valve 14 to decompress the refrigerant, an indoor heat exchanger 15 to exchange the heat of the refrigerant and the heat of the indoor air, an outdoor blower (not shown) to blow outdoor air to the outdoor heat exchanger 13, an indoor blower (not shown) to blow indoor air to the indoor heat exchanger 15, and a control unit (not shown) to control overall operation of the air conditioner 1.

The refrigeration cycle 10 in the air conditioner 1 is constituted, in the case of cooling operation, by switching the four-way valve 12 to the solid line side, to connect the compressor 11 and the outdoor heat exchanger 13 (condenser) via the four-way valve 12 by a first pipe 21 and a second pipe 22, to connect the outdoor heat exchanger 13 (condenser) and the expansion valve 14 (pressure reducing mechanism) by a third pipe 23, to connect the expansion valve 14 (pressure reducing mechanism) and the indoor heat exchanger 15 (evaporator) by a fourth pipe 24, and to connect the indoor heat exchanger 15 (evaporator) and the compressor 11 via the four-way valve 12 by a fifth pipe 25 and a sixth pipe 26.

The refrigeration cycle 10 in the air conditioner 1 is constituted, in the case of heating operation, by switching the four-way valve 12 to the broken line side, to connect the compressor 11 and the indoor heat exchanger 15 (condenser) via the four-way valve 12 by the first pipe 21 and the fifth pipe 25, to connect the indoor heat exchanger 15 (condenser) and the expansion valve 14 (pressure reducing mechanism) by the fourth pipe 24, to connect the expansion valve 14 (pressure reducing mechanism) and the outdoor heat exchanger 13 (evaporator) by the third pipe 23, and to connect the outdoor heat exchanger 13 (evaporator) and the compressor 11 via the four-way valve 12 by the second pipe 22 and the sixth pipe 26.

In the air conditioner 1, the compressor 11, the four-way valve 12, the outdoor heat exchanger 13, the expansion valve 14, the first pipe 21, the second pipe 22, the third pipe 23, the sixth pipe 26 and an outdoor blower (not shown) are accommodated in the outdoor unit 2.

In the air conditioner 1, the indoor heat exchanger 15, an indoor air blower (not shown) and a control unit (not shown) are accommodated in the indoor unit 3.

The fourth pipe 24 and the fifth pipe 25 constitute communication pipes for communicating the outdoor unit 2 and the indoor unit 3.

At the time of cooling operation of the air conditioner 1, the four-way valve 12 is switched to the solid line side. The refrigerant compressed by the compressor 11 becomes a high-temperature and high-pressure gas refrigerant, which is then sent to the outdoor heat exchanger 13. In the outdoor heat exchanger 13 (condenser), the gas refrigerant undergoes heat exchange with outdoor air to release heat and be condensed to become a high-pressure liquid refrigerant, which is then sent to the expansion valve 14. In the expansion valve 14 (pressure reducing mechanism), the liquid refrigerant is depressurized and becomes a low-temperature low-pressure gas-liquid two-phase refrigerant, which is then fed to the indoor heat exchanger 15. In the indoor heat exchanger 15 (evaporator), the gas-liquid two-phase refrigerant undergoes heat exchange with indoor air to absorb heat and be evaporated to become a gas refrigerant, which is then returned to the compressor 11. Indoor air having heat-exchanged with the refrigerant in the indoor heat exchanger 15 is cooled.

At the time of heating operation of the air conditioner 1, the four-way valve 12 is switched to the broken line side. The refrigerant compressed by the compressor 11 becomes a high-temperature and high-pressure gas refrigerant which is then sent to the indoor heat exchanger 15. In the indoor heat exchanger 15 (condenser), the gas refrigerant undergoes heat exchange with indoor air to release heat and is condensed to become a high-pressure liquid refrigerant, which is then sent to the expansion valve 14. The indoor air having heat-exchanged with the refrigerant in the indoor heat exchanger 15, is heated. In the expansion valve 14 (pressure reducing mechanism), the liquid refrigerant is depressurized and becomes a low-temperature low-pressure gas-liquid two-phase refrigerant, which is then sent to the outdoor heat exchanger 13. In the outdoor heat exchanger 13 (evaporator), the gas-liquid two-phase refrigerant undergoes heat exchange with outdoor air to absorb heat and is evaporated to become a gas refrigerant, which is then returned to the compressor 11.

Other Embodiments

The air conditioner of the present invention is not limited to the air conditioner of the illustrated example.

For example, although the air conditioner of the illustrated example is a heat pump type air conditioner capable of switching between cooling operation and heating operation, the air conditioner of the present invention may be an air conditioner for cooling only, or it may be an air conditioner for heating only.

The heat exchanger is not limited to the refrigerant-air heat exchanger and may be a refrigerant-liquid heat exchanger.

The decompression mechanism is not limited to the expansion valve and may be a capillary tube or the like.

The air conditioner of the present invention may be any of a home air conditioner, a business air conditioner or an automotive air conditioner. The connection mode of the indoor unit may be either integral type, separate type or multi-type. Further, the mounting installation mode of the indoor unit may be either floor-standing type, wall-hanging type, ceiling-hanging type, ceiling cassette type, built-in type or embedding type.

The air conditioner of the present invention employs a refrigerant composition having flammability suppressed and thus, even if the refrigerant leaks from the indoor unit, is safe as compared with a conventional air conditioner employing a highly flammable refrigerant.

Therefore, the air conditioner of the present invention is suitable for applications to install the indoor unit in the vicinity of the floor or in a closed narrow space where the refrigerant is likely to accumulate. Specifically, the air conditioner of the present invention is suitable for a floor-standing type air conditioner wherein the indoor unit accommodating a portion of the refrigeration cycle is installed on the floor in a room, or suitable for an automotive air conditioner. Further, the air conditioner of the present invention is suitable for a business air conditioner (such as a multi air conditioner for buildings) in which the amount of the refrigerant to be charged, is large.

Further, since the air conditioner of the present invention employs a refrigerant composition having flammability suppressed, also for a recovery apparatus for recovering the refrigerant from the air conditioner, it is not necessary to particularly provide a combustion inhibiting function, and therefore, it is possible to use a known recovery apparatus.

Advantageous Effects

In the air conditioner of the present invention as described above, the refrigerant composition sealed in the refrigeration cycle is a refrigerant composition of the present invention having flammability suppressed, whereby restrictions in order to inhibit combustion of the refrigerant composition is reduced, and measures for inhibiting combustion of the refrigerant composition may be omitted or simplified.

Specifically, in the air conditioner of the present invention, the filling amount of the refrigerant sealed in the refrigeration cycle can be increased as compared with a conventional air conditioner employing a highly flammable refrigerant.

Further, in the air conditioner of the present invention, it is possible to omit or simplify various measures (such as providing a gas leak sensor, providing a ventilator to the indoor unit, preventing sparks from electrical equipment or electrical wiring of the unit, etc.) required in a conventional air conditioner employing a highly flammable refrigerant.

Examples

Now, the present invention will be described in detail with reference to Examples. However, the present invention is not limited by the following description.

(Burning Velocity)

A burning velocity was measured by visualizing a flame of a mixture of a gas to be measured and air in a closed vessel by using the closed vessel, by the Schlieren visualization method (Schlieren method: ASHRAE Research PJ RP-1583, Appendix E), and directly observing and photographing it by a high-speed video camera.

Figure 2:
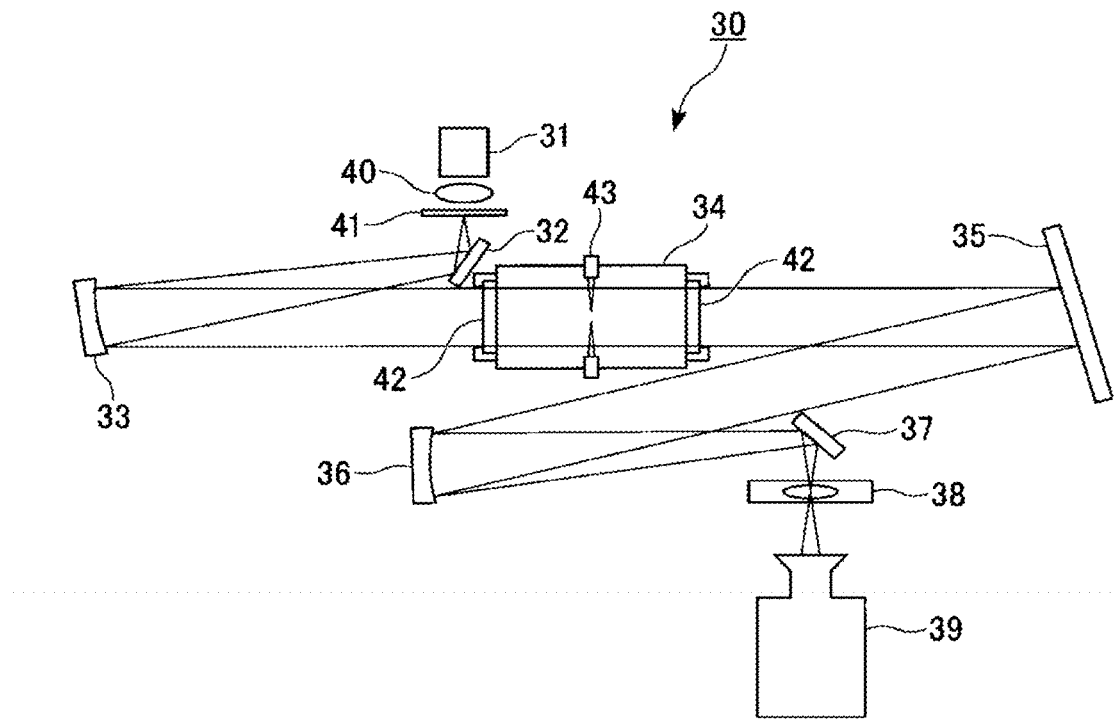
FIG. 2 is a schematic diagram showing an apparatus for measuring the burning velocity.

A burning velocity measuring apparatus is shown in FIG. 2. The burning velocity measuring apparatus 30 comprises a xenon lamp 31 being a Schlieren light source, a first plane mirror 32, a first concave mirror 33, a cylindrical vessel 34, a second plane mirror 35, a second concave mirror 36, a third plane mirror 37, a ring filter 38 and a high-speed video camera 39.

Light from the xenon lamp 31 is reflected by the first plane mirror 32 toward the first concave mirror 33. The light is reflected by the first concave mirror 33 and becomes parallel light, which passes through the cylindrical vessel 34 disposed coaxially with the parallel light, and is reflected by the second plane mirror 35 toward the second concave mirror 36. The light is reflected by the second concave mirror 36 and becomes a convergent beam, which is reflected by the third plane mirror 37, then passes through the ring filter 38 disposed at the focal point of the Schlieren image and is photographed by the high speed video camera 39.

As the xenon lamp 31, one having a convex lens 40 and a pinhole 41 disposed in front of the lamp body, was used.

As the cylindrical vessel 34, a cylindrical vessel (inner diameter 155 mm×length 200 mm) having an internal volume of 3.8 L and provided with a temperature control means and stirring blades, was used which was provided with transparent acrylic windows 42 at openings at both ends, and had a pair of electrodes 43 (inter-electrode distance $5 \times 10^{-3}$ m) inserted at the center.

As the high speed video camera 39, a high-speed CCD video camera (photographing 1,000 images per second) was used.

As the gas to be measured, one having a purity of at least 99.8% was used.

Using the partial pressure method, a gas to be measured and dry air were introduced into the cylindrical vessel 34 so that they would be in a predetermined equivalence ratio, followed by stirring for about 10 minutes to prepare a mixed gas of the gas to be measured and air with the predetermined equivalence ratio.

The temperature in the cylindrical vessel 34 was adjusted to be within a range of 25.0±2.0° C. by the temperature adjusting function of the cylindrical vessel 34.

Figure 3:
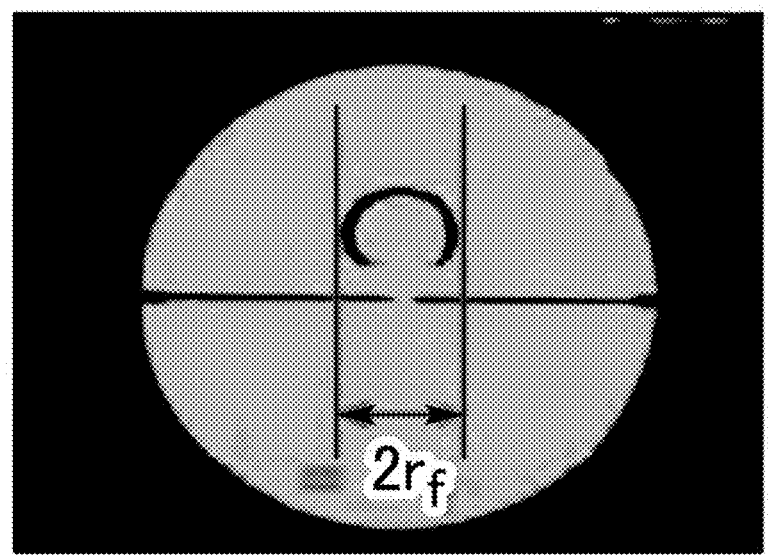
FIG. 3 is an example of an image showing the state of a flame in a cylindrical vessel, as photographed by a high-speed video camera of the apparatus in FIG. 2.

Using a DC high voltage power source, under conditions of a discharge time of 1 ms and a discharge energy of about 0.5 J, discharge was conducted between the pair of electrodes 43 to ignite a mixed gas. An example of an image showing the state of the flame in the cylindrical vessel 34 which was photographed by the high speed video camera 39 is shown in FIG. 3.

At the time of obtaining the burning velocity of a flame where the influence of buoyancy due to the combustion gas appears strong, in the initial stage of combustion where a pressure increase inside the cylindrical vessel is negligible, the burning velocity can be approximated by the following equation (4).

$$S_u = \frac{dr_f}{dt} \frac{\rho_b}{\rho_u} \quad (4)$$

where $S_u$ is the burning velocity, $r_f$ is the flame radius, $\rho_u$ is the gas density in the unburned region, and $\rho_b$ is the gas density in the burned region.

By applying the formula (4) as it is, on the assumption of a constant pressure combustion by using the data at the time when the pressure increase is within 1% excluding data at the initial stage of combustion strongly susceptible to influences of discharge and electrode 43, $S_i$, was evaluated by using actually measured $dr_f/d_t$ and the value of $\rho_b$ obtained by adiabatic equilibrium calculation of constant pressure conditions.

Ex. 1

The burning velocity of a mixed gas of HFC-32 (mole fraction: 0.6391) and HFO-1123 (mole fraction: 0.3609) was measured.

The mixed gas was prepared by filling HFC-32 and HFO-1123 in a container having an inner volume of 2 L, which was preliminarily evacuated to at most 1.333 Pa, and adjusting the mixing ratio by measuring the masses of the respective components by an electronic balance. The mixed gas was prepared a total of 5 times, whereby the measuring error of the mixing ratio was within ±0.2 mass %. $\rho_u$ of the mixed gas was obtained assuming ideal gas, and $\rho_b$ was obtained by adiabatic equilibrium calculation. The burning velocity of the mixed gas was measured at various equivalence ratios, to obtain the measured maximum burning velocity.

Further, using the measured value of the burning velocity of HFC-32 and the measured value of HFO-1123 preliminarily measured, the estimated value of the burning velocity in each equivalence ratio was obtained from the formula (2), to obtain the estimated maximum burning velocity.

The measured maximum burning velocity, the estimated maximum burning velocity and the combustion inhibiting effect obtained from the formula (1) are shown in Table 1.

Ex. 2 to 16

The measured maximum burning velocity, the estimated maximum burning velocity and the combustion inhibiting effect were obtained in the same manner as in Ex. 1 except that component (A), component (B), and their mole fractions were changed as shown in Table 1. The results are shown in Table 1.

Ex. 17

The measured maximum burning velocity, the estimated maximum burning velocity and the combustion inhibiting effect were obtained in the same manner as in Ex. 1 except that component (A), component (B), and their mole fractions were changed as shown in Table 1 and the air used for the measurement of the burning velocity was changed to an air with an oxygen concentration ratio of 29.8%. The results are shown in Table 1 and Table 2.

TABLE 1

| Ex. | Mixed gas First component | Mixed gas Second component | Mole fraction First component | Mole fraction Second component | Halogen/hydrogen atomic ratio in the entire mixed gas | Maximum burning velocity of each component [cm/s] First component | Maximum burning velocity of each component [cm/s] Second component | Maximum burning velocity of mixed gas [cm/s] Measured value | Maximum burning velocity of mixed gas [cm/s] Estimated value | Combustion inhibiting effect (%) |
|---|---|---|---|---|---|---|---|---|---|---|
| 1 | HFC-32 | HFO-1123 | 0.6391 | 0.3609 | 1.44 | 6.7 | 6.9 | 3.6 | 6.2 | 41.9 |
| 2 | HFC-32 | PFO-1114 | 0.75 | 0.25 | 1.70 | 6.7 | 6.8 | 2.4 | 6.5 | 63.3 |
| 3 | HFC-143a | PFO-1114 | 0.5 | 0.5 | 2.33 | 7.1 | 6.8 | <1.0 | 6.7 | >85.1 |
| 4 | HFC-152a | HFO-1123 | 0.25 | 0.75 | 1.56 | 23.5 | 6.9 | 5.7 | 8.1 | 29.6 |
| 5 | Methane | PFO-1114 | 0.25 | 0.75 | 3.0 | 36.5 | 6.8 | 4.8 | 8.8 | 45.5 |
| 6 | HFC-41 | PFO-1114 | 0.5 | 0.5 | 1.67 | 28.3 | 6.8 | 4.78 | 10.2 | 53.1 |
| 7 | HFC-152a | PFO-1114 | 0.5 | 0.5 | 1.50 | 23.5 | 6.8 | 5.2 | 12.1 | 57.0 |
| 8 | HFC-365mfc | PFO-1114 | 0.5 | 0.5 | 1.80 | 7.6 | 6.8 | <1.0 | 7.1 | >86.0 |
| 9 | HCFC-141b | PFO-1114 | 0.5 | 0.5 | 2.33 | 2.3 | 6.8 | 2.2 | 3.1 | 32.1 |
| 10 | HFC-152a | CFO-1113 | 0.5 | 0.5 | 1.50 | 23.5 | 3.4 | 3.2 | 4.8 | 33.2 |
| 11 | HFO-1141 | PFO-1114 | 0.5 | 0.5 | 1.70 | 56.1 | 6.8 | 10.9 | 15.7 | 30.8 |
| 12 | HFO-1132a | PFO-1114 | 0.75 | 0.25 | 1.70 | 27.8 | 6.8 | 9.6 | 17.7 | 45.7 |
| 13 | HFO-1243zf | HFO-1123 | 0.5 | 0.5 | 1.50 | 14.1 | 6.9 | 4.3 | 7.9 | 45.2 |
| 14 | HFO-1234yf | HFO-1123 | 0.75 | 0.25 | 2.70 | 1.6 | 3.4 | No combustion | 1.7 | No combustion |
| 15 | HCFC-142b | HFO-1123 | 0.25 | 0.75 | 2.0 | 5.5 | 6.9 | 4.2 | 6.4 | 34.4 |
| 16 | HFE-143a | PFO-1114 | 0.5 | 0.5 | 2.33 | 3.7 | 6.8 | <1.0 | 4.5 | >77.8 |
| 17 | HFC-152a | PFO-1216 | 0.5 | 0.5 | 2.0 | 49.7* | 3.2* | 4.9* | 6.9* | 28.8* |

*The burning velocity was measured by using oxygen-enriched air having an oxygen concentration rate of 29.8%

TABLE 2

| Mixed gas First component | Mixed gas Second component | Mixed gas Third component | Mole fraction First component | Mole fraction Second component | Mole fraction Third component | Halogen/hydrogen atomic ratio in the entire mixed gas |
|---|---|---|---|---|---|---|
| HFC-32 | HFO-1123 | HFC-152a | 0.245 | 0.519 | 0.236 | 1.29 |

| Maximum burning velocity of each component [cm/s] First component | Maximum burning velocity of each component [cm/s] Second component | Maximum burning velocity of each component [cm/s] Third component | Maximum burning velocity of mixed gas [cm/s] Measured value | Maximum burning velocity of mixed gas [cm/s] Estimated value | Combustion inhibiting effect (%) |
|---|---|---|---|---|---|
| 6.7 | 6.9 | 23.5 | 7.0 | 12.5 | 44 |

The combustion inhibiting effect of the fluid composition of the present invention, particularly composition (I), is one caused by the fact that the mechanisms for combustion reaction of the components (A) and (B) are quite different. The reaction proceeds by the following two types of reactions.

Firstly, combustion proceeds by an exothermic reaction due to self-decomposition of the halogenated alkene being component (B). In order to suppress this combustion reaction, dilution of the heat generation by polyatomic molecules with a large heat capacity causing no self-decomposition exothermic reaction is very effective. Therefore, by mixing component (A) being polyatomic molecules, the component (A) acts as a diluent, whereby the self-decomposition combustion reaction by the component (B) is suppressed.

Then, combustion of the component (A) proceeds. This combustion reaction is a usual radical chain reaction, and its rate is determined by a chain branching reaction of hydrogen atoms, oxygen atoms and OH radicals which are chain-carrying species. This burning velocity is known to be proportional to the concentration of hydrogen atoms present in the reaction zone of the flame. The hydrogen-halogen binding energy is very strong, and therefore, if a halogen is introduced into the reaction zone of the flame, a very stable hydrogen halide will be formed by the combustion reaction, and hydrogen being the active species is excluded from the reaction system, whereby it is possible to suppress the radical chain reaction. Therefore, by mixing, as component (B), a highly reactive halogenated alkene having the number of halogen atoms excessively relative to the number of hydrogen atoms, it is possible to supply a large amount of halogen atoms to the combustion reaction system, and to substantially reduce the concentration of hydrogen atoms in the flame, whereby it is possible to suppress the radical chain reaction by the component (A).

Here, suppression of the self-decomposition exothermic reaction of the component (B) is not affected by the flammability by the radical chain reaction of the component (A), and therefore, the component (A) may be a compound having any flammability. Therefore, from the viewpoint of less impact on global warming, it is preferred to select one having low GWP as the component (A). On the other hand, with respect to suppression of the radical chain reaction of the components (A), it is theoretically possible to suppress flammability of the fluid composition, if the halogen atom/hydrogen atom in the entire fluid composition is at least 1.0, and therefore, the component (B) is preferably one having halogen atoms excessively to satisfy this condition as a mixture.

INDUSTRIAL APPLICABILITY

The fluid composition of the present invention is useful as a refrigerant composition, a solvent composition, a blowing agent composition, a cleaning agent composition, etc.

REFERENCE SYMBOLS

1: air conditioner, 2: outdoor unit, 3: indoor unit, 10: refrigeration cycle, 11: compressor, 12: four-way valve, 13: outdoor heat exchanger, 14: expansion valve, 15: indoor heat exchanger, 21: first pipe, 22: second pipe, 23: third pipe, 24: fourth pipe, 25: fifth piping, 26: sixth pipe, 30: burning velocity measurement apparatus, 31: xenon lamp, 32: first plane mirror, 33: first concave mirror, 34: cylindrical vessel, 35: second plane mirror, 36: second concave mirror, 37: third plane mirror, 38: ring filter, 39: high-speed video camera, 40: convex lens, 41: pinhole, 42: acrylic window, 43: electrode.

What is claimed is:

1. A method of producing a fluid composition comprising:
    mixing
        component (A) 1,1,2-trifluoroethylene, and
        component (B) 1,1-difluoroethane,
        to obtain a composition (I), wherein (A) is present in an amount of from 63 to 90 vol % relative to the total of (A) and (B); and
    prior to the mixing, determining the component (A), the component (B), and a mixing ratio of the component (A) and the component (B) in the composition (I) such that the combustion inhibiting effect as defined by formula (1) becomes at least 10%, $$\varepsilon = -100 \times \frac{S_{u,max,blend} - S_{u,max,blend,calc}}{S_{u,max,blend,calc}} \quad (1)$$

where $\varepsilon$ (%) is a combustion inhibiting effect, $S_{u,max,blend}$ is the maximum value among measured values of the burning velocity in each equivalence ratio, and $S_{u,max,blend,calc}$ is the maximum value among estimated values of the burning velocity in each equivalence ratio obtainable by formula (2), $$S_{u,blend,calc}(\phi) = \frac{1}{\sum_{k=1}^{n} \frac{\alpha_i}{S_{u,i}(\phi)}} \quad (2)$$

where $S_{u,blend,calc}$ ($\varphi$) is an estimated value of the burning velocity in each equivalence ratio $\varphi$, n is the number of types of combustible components contained in the fluid composition, $S_{u,i}$ ($\varphi$) is the measured value of the burning velocity of the i-th combustible component, $\alpha_i$ is the energy fraction of the i-th combustible component obtainable by formula (3), $$\alpha_i = \frac{\Delta H_{c,i} \cdot x_i}{\sum_{k=1}^{n} \Delta H_{c,i} \cdot x_i} \quad (3)$$

where $\Delta H_{c,i}$ is the heat of combustion of the i-th combustible component, and $x_i$ is the mole fraction of the i-th combustible component.

2. The method according to claim 1, wherein the maximum value among measured values of the burning velocity in each equivalence ratio of the component (A) is at least 1 cm/sec, and
    the maximum value among measured values of the burning velocity in each equivalence ratio of the component (B) is at least 1 cm/sec.

3. A method of producing refrigerant composition comprising:
    producing the fluid composition by the method according to claim 1; and
    mixing a refrigerating machine oil and the fluid composition.

4. A method of producing an air conditioner comprising:
    producing the refrigerant composition by the method according to claim 3; and
    sealing the refrigerant composition in a refrigeration cycle.

5. The method according to claim 4, wherein the air conditioner is an air conditioner in which an indoor unit housing a part of the refrigeration cycle, is installed on a floor in a room.

6. The method according to claim 4, wherein the air conditioner is suitable for an automobile.

* * * * *